June 26, 1945. G. A. RUBISSOW 2,379,255
VIBRATION DAMPER
Filed Oct. 1, 1941 6 Sheets-Sheet 1
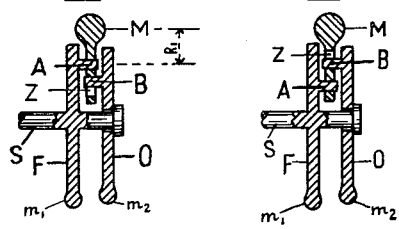
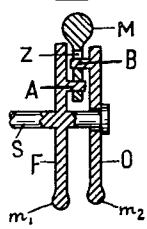
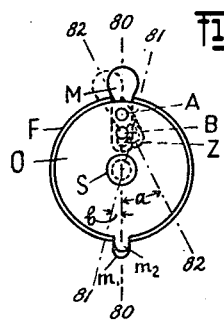
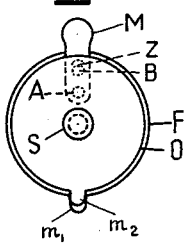
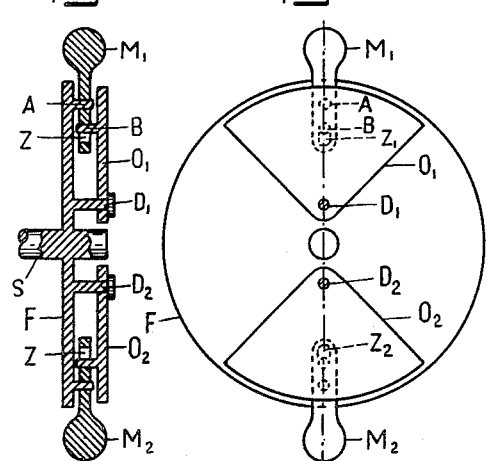
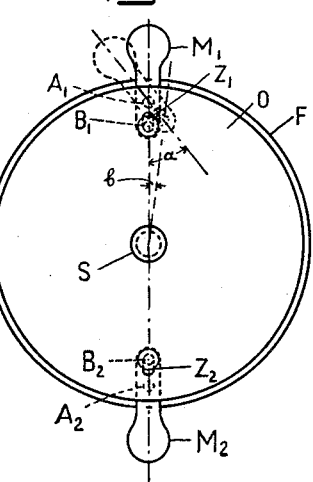
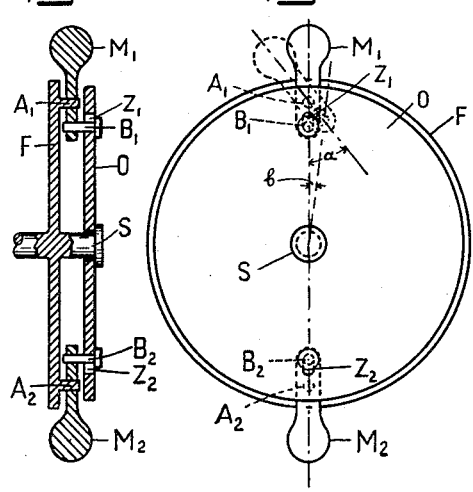
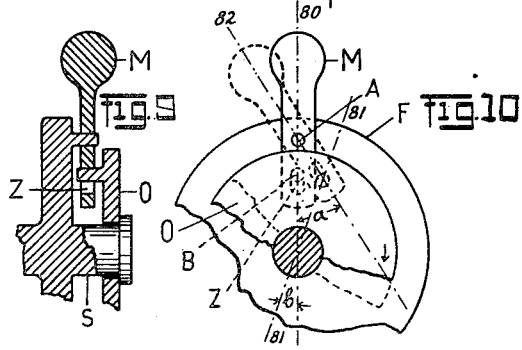
INVENTOR.
George A. Rubissow.

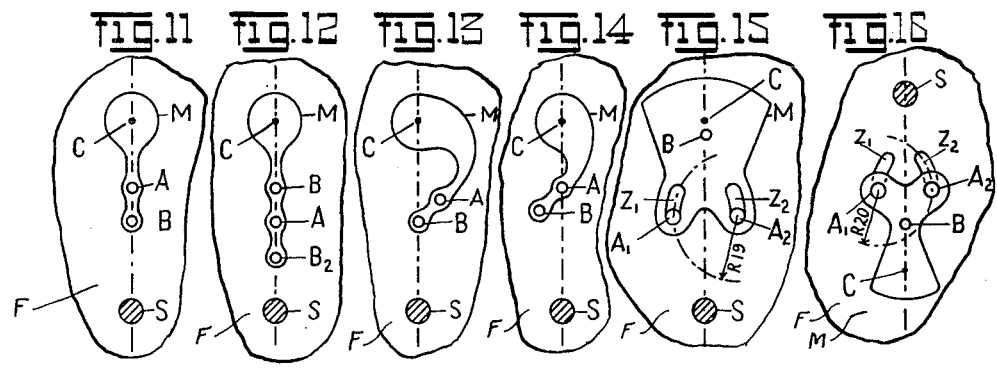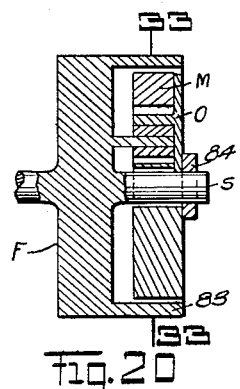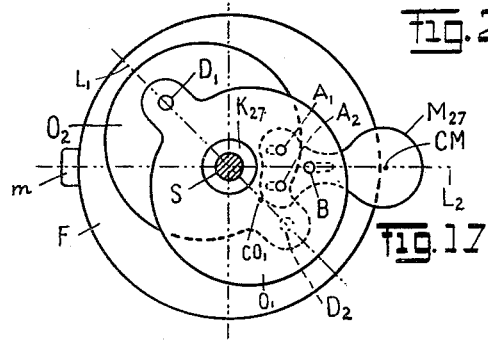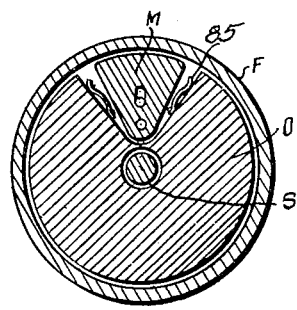

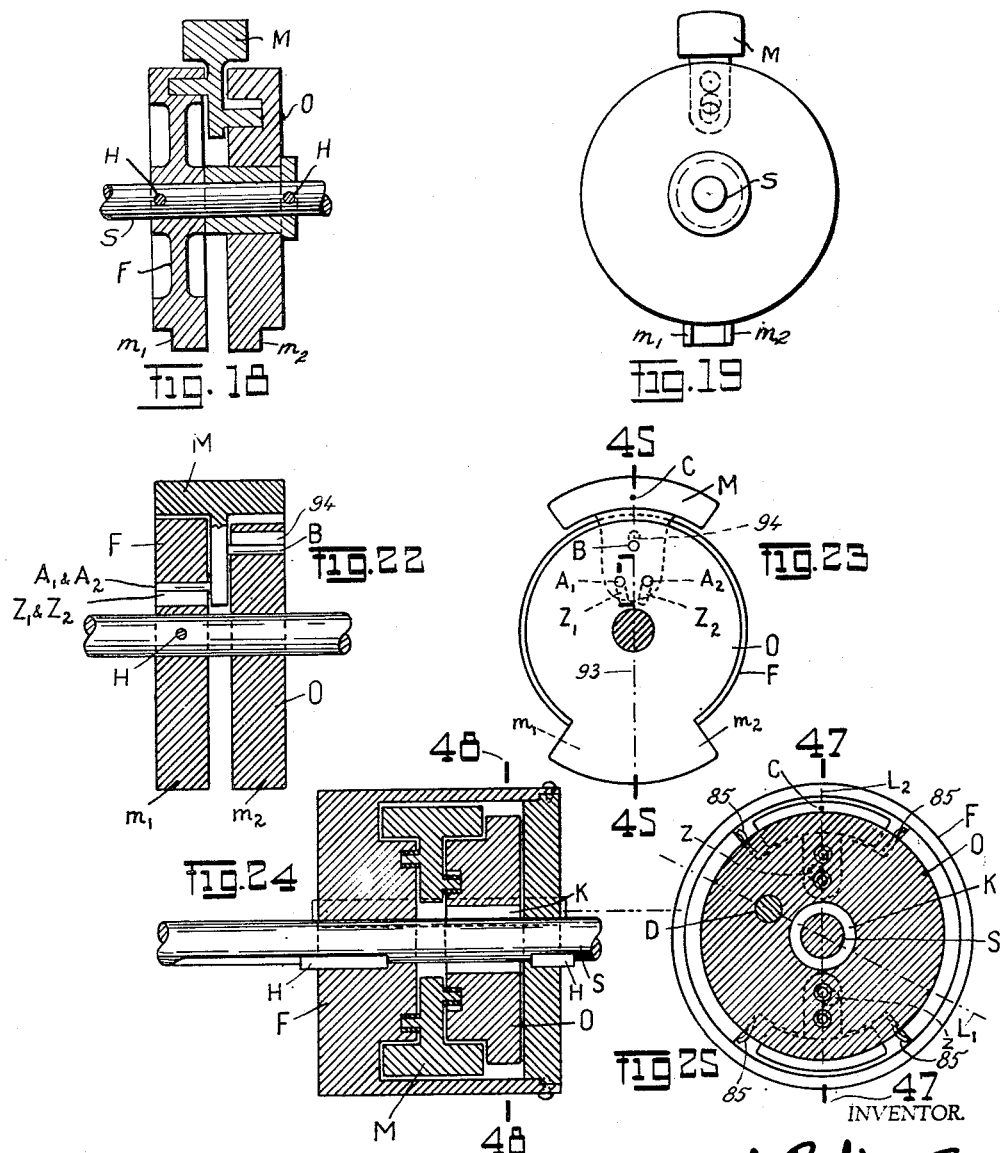

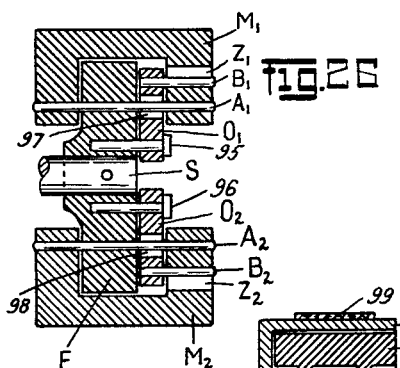
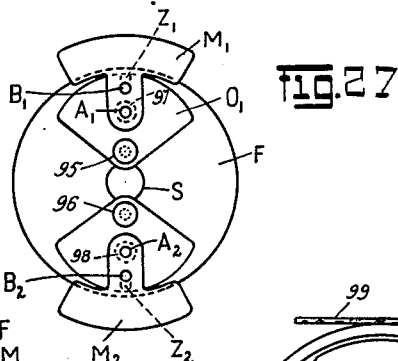
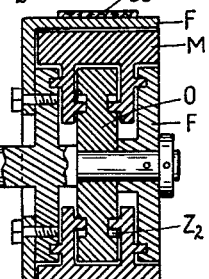
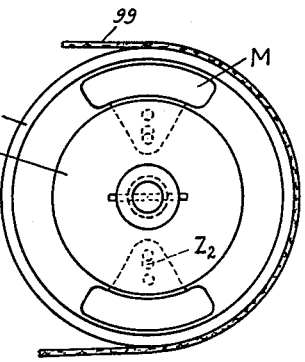
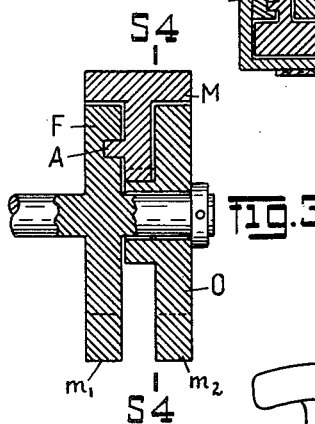
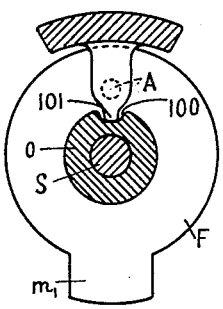
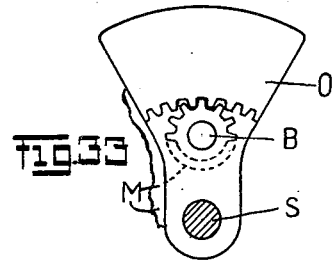
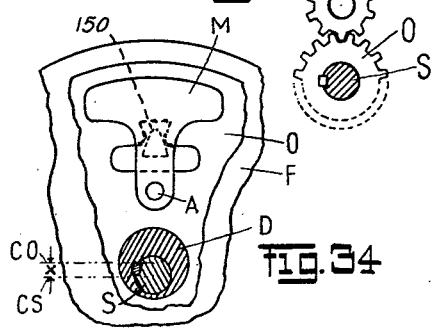

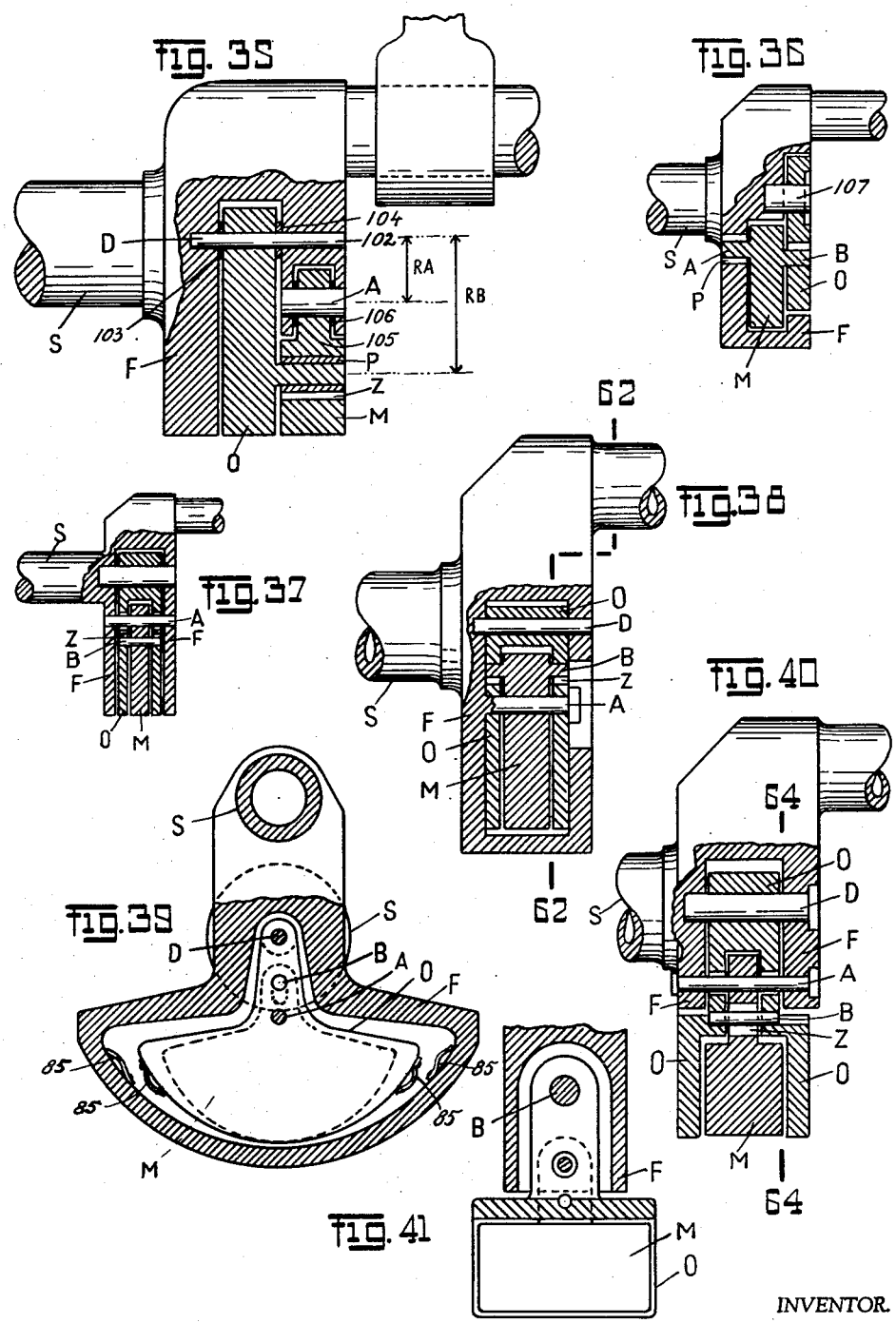

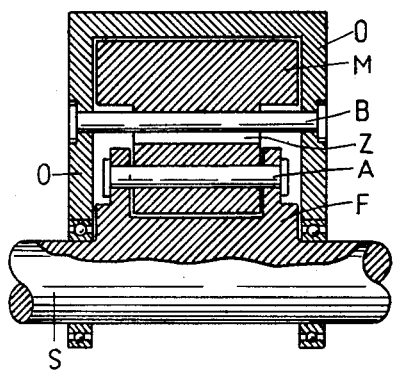
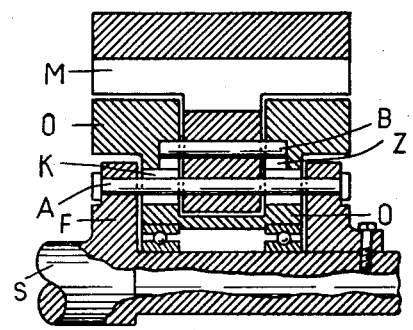
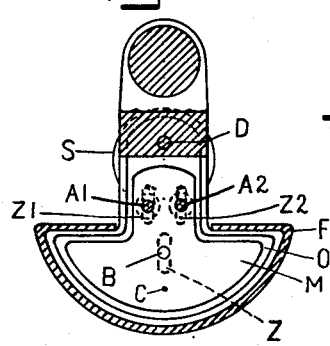
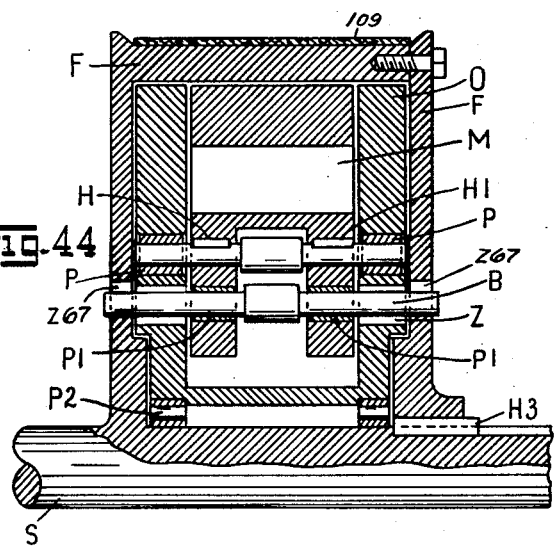
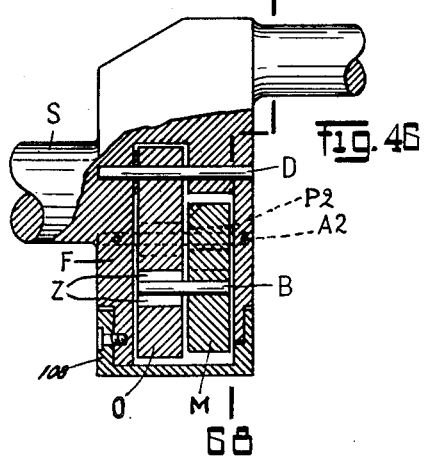
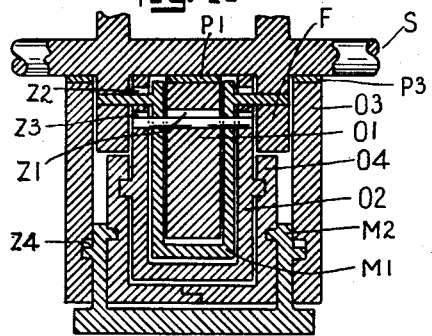

Patented June 26, 1945

2,379,255

UNITED STATES PATENT OFFICE 2,379,255

VIBRATION DAMPER

George A. Rubissow, New York, N. Y.

Application October 1, 1941, Serial No. 413,215
In Great Britain May 26, 1941

6 Claims. (Cl. 74—574)

This invention provides a new type of damper or device which may be employed in combination with any rotating shaft or element, or part of a machine or engine, to eliminate substantially in toto or in part, vibrations, jerks, speed oscillations or any other undesirable irregularities that may occur.

This invention is very economical and mechanically of a very simple and solid construction, one that can be easily applied to any existing type of shaft, flywheel, counterweight of a crankshaft, or to any other rotating element or part, and used on any type of engine: reciprocating, internal combustion, two-cycle or four-cycle. It is particularly applicable on automobile engines, marine and aeroplane engines and trucks, as well as to electrical machinery.

The device described herein may be also applied to various type of separators, centrifugal machinery, mills, turbines, steam machines, pumps, centrifugal pumps, piston pumps, rolling mills, fans, ventilators, presses, various cinematographic machines, propeller of aeroplanes, screws of ships, gyroscopes, and every type of machine where rotating parts play an important role. Vibrations not only in the shaft, crankshaft, or in the rotatable element itself are substantially eliminated, but also in the machine or engine to which the rotatable shaft, crankshaft or element belongs.

This device may be adapted to any suitable part of the shaft, either in the front or rear; outside or inside of the engine; on the flywheel or in place of the flywheel; on the counterweight or in place of the counterweight; on the casing of a rotating container, or on the drum, the wheel, the roller, etc. etc.

In reciprocating internal combustion engines, the problem of elimination or diminution of disturbing torques of any origin may be very satisfactorily solved by the herein described device.

In the accompanying drawings:

Figures 1, 3, 5, 7, 9 and 2, 4, 7, 8, and 10, show respectively a cross-sectional and side-views of different schematic arrangements of the three-mass system herein described.

Figures 11, 12, 13, 14, 15, 16 and 17 show diagrammatically views in elevation of modifications of the impulse mass M.

Figures 18, 20, and Figures 19 and 21 represent respectively cross-sectional side-views of different modifications of this device and their respective end views.

Figures 22, 24, 26, 28, 30, and respectively, 23, 25, 27, 29 and 31 represent cross-sectional side-views and end-views of different modifications.

Figures 32, 33 and 34 represent various operative connections between the masses M and O.

Figures 35 to 38 and 40 represent cross-sectional views of various modifications of this device employed in combination with counterweights, or in place of the same, in crankshafts of automobile engines, aeroplane engines, star engines or any other type of engine.

Figure 39 is a view partly in cross-section of Figure 38.

Figure 41 is a broken-out cross-sectional plan-view of Figure 40.

Figures 42, 43 and 44 are other modifications of this device in cross-sectional side-view employed in combination with ordinary shafts, or instead of counterweights of flywheels.

Figure 45 is a view of a counterweight of a crankshaft.

Figure 46 is a cross-sectional side-view of Figure 35.

Figure 47 is a cross-sectional side-view of a broken-out part of a multi-mass arrangement.

The above and further objects and novel features will more fully appear from the following detailed description when the same is read in connection with the accompanying drawings. It is to be expressly understood, however, that the drawings are for purposes of illustration only, and are not intended as a definition of the limits of the invention.

In the drawings, wherein like reference characters refer to like parts throughout the several views, diagrammatic schemes of different arrangements according to this invention are shown, and also, by way of example, several forms of execution of this invention.

For the convenience of the description, all the devices according to this invention will be considered as embodying a three-mass system, composed of masses F, O, M, in which the first mass will be called F and will be part of the main shaft of any machine, device, apparatus or engine, or a part of the shaft, flywheel or counterweight of a crankshaft in any engine, but in especial, in that of an automobile, marine or aeroplane engine. The mass F will be rigidly attached to or form one rigid mass with any rotating shaft, main shaft, driving or driven shaft.

The second mass O will be the oscillatory mass, so attached in relation to the first mass F or to the shaft to which F is attached, that it can move freely but limitedly, i. e. can pivot with as little friction as possible around the said shaft or around any chosen axle D eccentric to the axis of the said shaft, axle D being rigidly affixed in respect to F or to the said shaft. Mass O acts as a shock-absorber or dampener.

The third mass M is the free mass—the pulsating or impulse mass. This mass must be two-axis pivotally free but limited in its movements, i. e. it must be able to pivot within limits simultaneously around two axes around one axle A, which establishes an operative connection with mass F, and around another axle B, which establishes another operative connection with the oscillatory mass O.

The centers of gravity of mass F, O or M will be designated as C; the shaft as S; the axles of the pivotal operative connections as A and B, the axles on which O and M pivot.

The functioning of this three-mass dampening vibration diminishing device is more clearly apparent and comprehended from the drawings.

One embodiment of this invention is illustrated schematically on Figures 1 and 2, wherein mass M is pivotally suspended from axle A which is rigidly affixed to mass F or forms a part of F. Simultaneously, mass M also pivots around the axle B which is rigidly affixed to or forms a part of the oscillatory mass O. Mass F is a part of the shaft S. Mass O can move freely but limitedly around the shaft S. Axles A and B form the operative connection of mass M with masses F and O.

When the shaft S is rotated, the whole system is rotated and the centrifugal forces, for as long as the rotation is constant and homogeneous, keep all three masses in their appropriate and balanced positions, independent of the number of revolutions of the shaft.

As soon as sudden acceleration or any irregularity in the rotation of the shaft or in the engine itself, occurs, mass M immediately and automatically becomes momentarily unbalanced and moves or pivots suddenly forward or backward from whatever direction the impulse derives, and in thus moving around the axle A, mass M forces the oscillatory mass O to displace or to oscillate through the pivotal operative connection B. The oscillatory mass O must, therefore, be displaced from its regular, predetermined balanced position—balanced in respect to the shaft—from one angular position to a new angular position, which operation becomes a dampening action, a large part of the vibration, oscillations, jerks, etc. being absorbed by the movements and oscillations transmitted to the oscillatory mass O.

Immediately thereafter, or simultaneous with the action which causes the free mass M to pivot, the oscillatory mass O is moved accordingly, whereupon masses O and M force the device to return to its balanced position. The operative connection by means of axle A and pivotal operative connection B provides the automatism of respective responses of the movements of masses F, M and O.

Figure 1 shows mass M attached to one side of the flywheel F. Assuming the weight of mass M to be M lbs., then the entire three-mass system must be balanced through the counterweights $m_1$ and $m_2$, the weights being so chosen, that, taking into consideration all the elements of which the three-mass system is composed, the system will be balanced.

It can be seen from Figure 2 that when mass M is moved counterclockwise to position $M_1$, the axle or pin B forces the oscillatory mass O to move clockwise from its balanced position 80—80 to a new position 81—81. In this particular arrangement, characterized by the respective positions of axles A and B, in respect to the shaft, the angular displacement of M of "a" degree, between 80—80 and 82—82, is greater than the angular displacement of oscillatory mass O from 80—80 to 81—81, i. e. greater than "b" degree. For this arrangement, it is necessary to provide an opening Z in the mass M. This opening will permit mass O to oscillate when mass M has pivoted to and fro around axle A and has operatively engaged axle B to pivot around the shaft S, following the movements of mass M. This arrangement allows masses M and O to move in opposing directions which is advantageous for very quick conversion of an unbalanced position to a balanced one, inasmuch as the oscillatory mass O acts, by its impact inertia, as a brake against the unbalanced impulse provided by mass M. Such an arrangement of F, O, M, and A and B will be referred to in this specification as an opposite movement three-mass system.

In contradistinction to this opposite three-mass system, several other arrangements described and illustrated in this specification, will provide a uni-directional movement of masses M and O when any impulse is given by mass M to mass O or vice-versa. This system will be referred to herein as a unidirectional three-mass system.

This unidirectional type of three-mass system is shown on Figures 3 and 4 wherein is a similar arrangement to that illustrated in Figure 1, with the exception that the mass M pivots around the axle A which is closer to the shaft S than the axle B. In this arrangement, an opening Z must be provided in the mass M so that when the mass M oscillates to and fro around axle A, the axle B remains at a constant distance from the shaft S, and is able to displace in the opening.

Figures 5 and 6 show oscillatory masses $O_1$ and $O_2$ suspended not around the shaft S, but around the axles $D_1$ and $D_2$, eccentric to the axis of the shaft S.

Openings $Z_1$ and $Z_2$ must be provided to permit the displacement of $M_1$ and $M_2$, and the oscillation of $O_1$ and $O_2$. An arrangement such as this provides another important aspect of this invention.

Figures 7 and 8 show an arrangement similar to the arrangement described in Figures 1 and 2, with the exception that axle B is not rigidly affixed to the oscillatory mass O, but rigidly affixed to the mass M. Also, instead of counterweights $m_1$ and $m_2$, another mass $M_2$ is symmetrically arranged opposite to the mass $M_1$. Mass $M_1$ and the characteristics of all the elements $A_1$, $B_1$ and $Z_1$ may be equal to $M_2$, $A_2$, $B_2$, $Z_2$, etc. However, if desired, the characteristics of $A_1$ and $B_1$ and $A_2$ and $B_2$ and the respective distances between themselves and in relation to the shaft S, may be unequal so as to permit a simultaneous elimination of oscillations of different characters: one—$A_1$ and $B_1$ eliminating vibration and jerks caused by one kind of harmonic, or in response with certain kinds of irregularities caused by the rotating action of the shaft, and the other—$A_2$ and $B_2$ eliminating other kinds of disturbing defects or irregularities.

Figures 9 and 10 are shown in exaggerated dimensions. The operation of mass M according to Figures 1 and 2, consists in its displacement 82—82, i. e. it forms an angle of "a" degree. At the same time the oscillatory mass O is displaced in a counter-direction, and forms the angle of "b" degree between 80—80 and 81—81. It is necessary, as illustrated, to provide the opening Z in mass M.

Figures 11, 12, 13, 14, 15 and 16 show schematically different suspensions of mass M in respect to the axles A and B and in respect to the shaft S. Axles A and B may lie on the radial axis, i. e. the axes of M, A, B and C, may be on one line and pass through the center of gravity C of mass M.

In Figure 13. C, B and S, or C, A and S, lie in a radial direction. Figure 14 shows the same arrangement as Figure 13 except that the radius passing through C, A and S, leaves the axle B to the left of the radius.

Another embodiment of this invention provides a bifilar suspension for mass M. This bifilar suspension is illustrated in Figure 15 wherein the mass M is suspended on $A_1$ and $A_2$. Openings $Z_1$ and $Z_2$ are provided to permit the mass M to pivot both left and right. When pivoting to the right around $A_1$, the center of gravity C will move the right side of the mass M in respect to $A_2$, and when pivoting to the left around $A_2$, the left side of the mass M will be moved in respect to $A_1$. This pivotal action around two axles $A_1$ and $A_2$ is more complicated than around a single axle, as shown by A on Figure 1. Axles $A_1$ and $A_2$ are rigidly affixed to F. If axles $A_1$ and $A_2$ are rigidly affixed to M instead of to F, then mass F must be provided with openings (bearings) to receive $A_1$ and $A_2$ and with openings $Z_1$ and $Z_2$ as shown on Figure 16.

Openings $Z_1$ and $Z_2$ may be made so that their symmetry axis follows the circumferences of the radius $R_{19}$.

Mass M of Fig. 16 is further operatively connected to mass O by means of a pivot or an axle B, which may be a part of mass M. A cut-out must be provided in mass O to permit it to oscillate around the axle $D_1$.

Figure 17 shows another embodiment wherein there are two oscillatory masses, $O_1$ and $O_2$ mounted on axles $D_1$ and $D_2$. Cut-out $K_{27}$ may be provided in $O_1$ and $O_2$ to permit the pivotal movement around the shaft S. Mass M is mounted on bifilar axles $A_1$ and $A_2$. The oscillatory masses $O_1$ and $O_2$ are operatively connected through the axle B to the mass $M_{27}$. Mass $M_{27}$ must be balanced by $m$ affixed to F, or an equal second mass $M_{27}$ must be mounted symmetrically on mass F. Such a system represents two balanced oscillatory masses $O_1$ and $O_2$ and one or more impulse masses $M_{27}$.

Instead of two masses $O_1$ and $O_2$, only one mass may be used, or a plurality of masses O, i. e. $O_1$, $O_2$, $O_3$ and $O_4$ may be mounted symmetrically in respect to the shaft S.

When the oscillatory mass O is mounted coaxial to the shaft S, so that oscillatory mass O may pivot around the axle of the shaft S as shown on Figures 1, 2, 3, 4, then oscillatory mass O is always in a balanced position and represents an ideal inert dampening mass, even if the system is rotated at both very high or very low speed.

As soon as the oscillatory mass O is mounted eccentric to the axis of the shaft S, as shown in Figures 5, 6, 17, 40, 41 and 45, then the mass O itself, in addition to its dampening effect, also becomes sensitive to the vibrations, irregular accelerations, jerks, which may occur in such a system.

This invention covers all kinds of suspension of the oscillatory mass O, coaxial or eccentric to the shaft D. If the mass O is eccentric to the shaft S, it may be pivoted on one pivotal axle (D) or on a bifilar axle ($D_1$ and $D_2$).

The impulse mass M must be so chosen that it becomes very sensitive to almost any irregularity occurring during the rotation, whereat as soon as the mass M begins to pivot because of such irregularity occurring in the system, then mass O substantially damps such irregularities in toto or in part.

When the bifilar suspension is used, either for the impulse mass M or for the oscillatory mass O, it should be kept in mind that it provides a knocking effect when the masses pivot which may be reduced by appropriate choice of the center of gravity of the oscillatory mass O in order to provide a dampening effect through the intermediary of the axle B when the mass M is returned to its bifilar position.

In all the figures except Figure 17, masses $M_{27}$ and $O_1$ have been shown so that their centers of gravity and the axes of the axles on which they are suspended and around which they pivot, lie on a radial line passing through the center of gravity and the pivotal axle. Such arrangements are very symmetrical, easily constructed and balanced. For special purposes, another embodiment of this invention can provide a-symmetrical arrangements between the symmetry line of the oscillatory mass O, passing through the axis of the axle on which this oscillatory mass O pivots, and through the axis of the shaft and the center of gravity of the said oscillatory mass, and the symmetry line of the impulse mass $M_{27}$ passing through its center of gravity, through the axis of the shaft and through the axle on which said mass $M_{27}$ pivots (axle B as shown in Figure 17). These two symmetry lines are shown on Figure 17 by $L_1$ and $L_2$. If only one mass $O_1$ suspended on $D_1$ and only one mass $M_{27}$ are used, then as soon as this device rotates, the two masses take the position as shown by $L_1$ and $L_2$.

It may be stated that such arrangements provide a dynamic balance condition between masses $O_1$ and $M_{27}$. The mass $M_{27}$ may be also suspended on a single axle A instead of bifilar suspension $A_1$ and $A_2$, as shown, for instance, on Figures 11, 12, 13 and 14.

An arrangement as previously described, in which the symmetry lines $L_1$ and $L_2$ of the oscillatory mass O and of the impulse mass M form an angle, provides devices of very high sensitivity which can be compared with tensed muscles. Different angle arrangements between the lines $L_1$ and $L_2$ from zero to 180° moving left to right, or from zero to 360° moving in an angular direction, may be employed. In this case, the oscillatory masses may be suspended by any of the methods described in this specification. The impulse mass M may also have any form and method of suspension as described herein.

Thus, the arrangement as per Figure 17 does not limit this invention thereto, and various arrangements may be employed combining the details herein described, provided that $L_1$ and $L_2$ or a plurality thereof, form a required angle or angles between them.

Independent of the employment of the serrated connection 150 shown on Figure 34, another embodiment of a pivotal suspension of the oscillatory mass O is shown thereon, consisting of the mass O being pivoted around the circular shaft-element $D_{57}$, mounted eccentrically on the shaft S and rigidly affixed thereto. When pivoting around $D_{57}$, the mass O is semi-free, due to the fact that when the shaft S rotates, the center of gravity of mass O urges it into its permanently balanced position.

If the shaft-element D approaches very closely to the shaft S as shown on Figure 34, i. e., if the axis of D is, for example, at a distance of only 1 to 6 millimeters away from the axis of the shaft S, then the mass O will be limitedly but substantially freely movable. Appropriate choice of the distance between CO, the center of gravity of the oscillatory mass O, and CS, the center of the shaft S, should be made. This distance will be hereinafter designated as "X." The effect of the dampening mass O may, in such an arrangement, be varied in accordance with the choice of the said distance "X."

It should be further noted that although this eccentric arrangement by means of a circular shaft-element $D_{57}$ is illustrated only on Figure 34, this arrangement may be used in combination with any of the other figures, wherein the oscillatory mass O (or $O_1$ and $O_2$) is shown as freely rotatable within limits around the shaft S, i. e., co-axial thereto. Instead of such co-axial pivoting of O around S, a slightly eccentric pivoting of O around S may be effective. In many cases, X=2, or X=10 millimeters will provide very efficient masses still relatively free in their oscillatory movements, but offering nevertheless, high-dampening effects, without being, themselves, overtly sensitive to the impulses caused by the speed oscillations or vibrations occurring in the system.

If desired, a plurality of masses O—$O_1$, $O_2$, or $O_3$, may be employed with masses $M_1$, $M_2$, and $M_3$, (or $M_1$ and $M_2$, $M_3$ moving $B_1$ and $B_2$ as shown on Figure 12). Each of these masses may be mounted on different types of slightly eccentric shaft-elements, $D_1$, $D_2$, $D_3$, having their distances, respectively, for example, 1 mm., 1½ mm., 4 mm.

The above is offered by way of example only and does not limit the invention to any suitable choice of distances.

A particularly interesting arrangement is provided when two oscillatory masses $O_1$ and $O_2$ are in the form of disks and are mounted on the shaft S with "$X_1$" and "$X_2$" being only approximately 1 to 6 mm. and if they are used with two impulse masses $M_1$ and $M_2$ of a type as shown on Figure 11. The masses $M_1$ and $M_2$ are placed exactly opposite each other and symmetrical in respect to the shaft, so that the axes $L_1$ and $L_2$ (as defined in references to Figures 17 or 24) form a right angle between them. This example does not limit any other arrangement of any of the elements herein described.

Another very effective embodiment of this invention consists in the distribution of the weight in the oscillatory masses O or $O_1$, $O_2$, $O_3$ . . . if more than one mass is employed. This aspect consists in that the center of gravity of such mass O (or $O_1$, $O_2$, etc.) is situated when the mass O is in its balanced position, i. e. under constant rotation, preferably on the axis of the shaft.

It is preferable that the perpendicular axis passing through the center of gravity of mass O, i. e. parallel to the axis of the shaft be also co-axial with the same axis of the shaft S. An arrangement such as this provides a very sensitive dampening mass O or masses O, if more than one is employed, although they are mounted slightly eccentric to the shaft S. This arrangement is very useful in connection with disk-formed oscillatory mass O or a plurality thereof.

Another very important object of this invention consists in so distributing the weight of each oscillatory mass employed, that even if the mass is pivoted around an axle D eccentric to the shaft S, and even if axle D is at a relatively great distance from the shaft, the center of gravity of this mass O is located on the axis of the shaft S when the three-mass system F—O—M is under rotation at constant speed.

This arrangement prevents the exertion of strong forces on the axis D during the rotation and while permitting the pivoting around D, still provides an oscillatory mass which, when rotated, is at constant speed dynamically balanced in respect to any position in respect to the axis of the shaft. This will be the case if the center of gravity C of the mass O on Figure 47 will be located in the center of the shaft S, which can be very easily arranged by a corresponding distribution of the weight along the mass O.

It is impossible to apply this feature to arrangements of $O_1$ or $O_2$ as shown on Figures 5 and 6, inasmuch as, in this case, the center of gravity of each of these masses cannot be co-axial with the axis of the shaft.

On Figure 17, the oscillatory masses $O_1$ and $O_2$ have their center of gravity, $CO_1$—$CO_2$ for instance, eccentric to the axis of the shaft. However, in this latter case, the center of gravity CO can very easily be removed, so that it will lie on the axis of the shaft S, inasmuch as, in reality, there is no material belonging to mass $O_1$ in the center of the shaft because of the cut-out $K_{37}$. The center of gravity CO, if removed to the center of the shaft S will also be an imaginary point.

Another important object of this invention consists in providing the center of gravity of the oscillatory mass O not coincident with the center of the shaft, i. e. with the axis of the shaft S. This arrangement will continuously urge the oscillatory mass O to remain in its balanced position due to the center of gravity of the mass O being situated eccentric to the axis of the shaft S. The three-mass system, F—O—M, in which this type of oscillatory mass is used, may be balanced by compensating weights affixed according to the mass F, so that the excess of the weight caused by the placing of the center of gravity of the mass O outside of the axis of the shaft, will be compensated for and balanced by these compensating weights.

It is self-evident that each of the devices shown on all the figures of this specification must be well-balanced (before ready for operation), by means of symmetrical distribution of the material in F—O—M, or by adding compensating weights at the most suitable places, whatever the suspension or the character of the masses may be, one in respect to the other.

It should be noted that the pivotal axles A and B, and the axle D may be provided with friction-diminishing means, preferably with bearings of such types as shown, by way of example, on Figures 24 and 25. Such bearings may be applicable to any arrangement shown in other figures, and may be of any nature—roller, ball-bearing, needle-bearing, cushion, etc.

This invention does not limit the simultaneous use of a plurality of masses of different characteristics or a plurality of pairs of equal masses.

Figures 18 and 19 show a flywheel F provided with mass M and oscillatory mass O.

On Figures 20 and 21, the flywheel F forms a protective casing 83, and mass M is so located inside of the whole device that it is not visible from the outside. In order to prevent mass O from moving, the shaft S is provided with a ring 84 rigidly affixed in respect to the shaft S. The oscillatory mass O can freely but limitedly rotate around the shaft S. As demonstrated in Figure 18, a bearing of any type may be placed between this mass O and the shaft S. In many cases, no bearing will be required. It will suffice just to adjust the shaft S to the opening in the oscillatory mass O so that the mass will be permitted to move with sufficient accuracy.

To prevent mass M from knocking against mass O, springs 85 may be provided, or, in lieu of springs, a rubber cushion or other shock-absorber such as a pneumatic piston device.

Figures 22 and 23 represent one embodiment of the arrangement according to the schematical drawings on Figure 15. Openings $Z_1$ and $Z_2$ must be provided in F as shown on Figure 23 so that when the mass M oscillates to and fro in respect to the symmetry axis 93, it can engage in corresponding oscillation the mass O.

Figures 24 and 25 represent another embodiment of a flywheel in which the oscillatory mass O is of comparatively heavy weight in relation to the mass M, and is situated according to the scheme described in reference to Figure 17. The mass O pivots around the shaft or axle D, its movements limited by the cut-out K. $L_1$ and $L_2$ form an angle.

Figures 26 and 27 represent still another embodiment of a flywheel having heavy masses $M_1$ and $M_2$ placed on the exterior of the device, and comparatively small oscillating masses $O_1$ and $O_2$ which are mounted on axles 95 and 96 eccentric to the shaft S. Openings $Z_1$ and $Z_2$ must be provided in the mass M to permit its oscillation. In the oscillatory masses $O_1$ and $O_2$, the openings 97 and 98 must be provided around the axles $A_1$ and $A_2$ to permit the pivoting of the elements composing the device.

Figures 28 and 29 show a device, the outer wall of which is rigid in respect to the flywheel F, so that it can receive a belt 99. When this device is employed in combination with a flywheel, or in lieu thereof, a much more effective flywheel is provided.

In a majority of cases, a much lighter flywheel than that commonly used, equipped with this device, may be used for the same purpose, and, despite its much lighter weight, offer even greater efficiency and smoothness of operation than the much heavier one. This device, therefore, offers both considerable saving in weight as well as increased efficiency.

Figures 30 and 31 represent another embodiment of transmission of the impulse from the mass M to the oscillatory mass O. In this arrangement, instead of two axles A and B, only one axle A is employed, and in lieu of axle B, the oscillatory mass O is provided with a cut-out 100 in which a toothed member 101 belonging to the mass M fits, so that when the mass M is oscillated to and fro, the member 101 contacts the cut-out 100 and engages the oscillatory mass O.

Figures 32, 33 and 34 show different ways of replacing the axle B by a toothed connection composed of one or more teeth.

Still another embodiment of this invention is shown on Figure 35 wherein the three-mass device is adapted to the crankshaft of an internal combustion engine. This device may be employed for the crankshaft of a star engine, and particularly of an aeroplane engine, in which the counterweight on Figure 35 is composed of masses F, O and M, F being a part rigidly affixed to or forming one body with the shaft S.

By way of example, the pivoting mass M is affixed, by means of axle A, eccentric to the axis of the shaft. If desired, axle A may be placed below or above the axis of the shaft. Axle A must be rigidly affixed with respect to F, if the mass M pivots around it, or it may be rigidly affixed to the mass M, in which case mass M and axle A rotate within the bearing provided for this purpose in F.

Oscillatory mass O may also, by way of example, be suspended pivotally, as shown, around an axle, this axle being co-axial to the axis of the shaft. If desired, it may be placed below or above the shaft. Axle B is rigidly affixed to mass O or forms a part thereof. When an arrangement such as this is employed, an opening Z should be provided below axle B to permit the oscillatory moments of masses O and M. If the axle B forms a rigid body with the impulse mass M, then an opening is required and must be provided in the mass O. Washers, 103, 104, 105 and 106 may be provided between the moving surfaces of masses F, M and O.

A similar arrangement is shown in Figure 36 wherein the oscillatory mass O is mounted co-axially with the shaft S on the axle 107.

Figure 38 shows the oscillatory mass O mounted co-axially to the shaft S.

Figure 39 shows a view in cross-section 39—39 of Figure 38.

Another arrangement is shown on Figures 40 and 41 which is self-evident.

Figures 42, 43 and 44 show another distribution of the three masses F, M and O, which may be used for the counterweight and also for an ordinary flywheel.

Figures 45 and 46 show another arrangement for the counterweights of an aeroplane in accordance with the schematical drawing as shown in Figure 16, the operation of which device is also self-evident. If desired, this type of three-mass anti-vibration device may be mounted in accordance with Figures 16 and 17, or any other system of suspension described herein.

On Figure 45 the member 108 forms a part of F, and is rigidly attached to F by suitable fixation means after the interior masses O and M are mounted.

On Figure 46, still another arrangement is depicted, in combination with a belt 109, the operation of which is self-explanatory.

For certain purposes, a combination of several interconnected masses, or groups of three interconnected masses, according to the various modifications of this invention, may be employed instead of three separate masses. This multi-mass device is shown on Figure 47, by way of example, consisting of two masses $M_1$ and $M_2$, the first operatively connected with $O_1$ and F, the second operatively connected with $O_3$ and $O_4$, and the mass $O_2$ in between the masses $M_1$ and $O_4$ in order to create the operative interconnection. Such multi-mass systems may have many varieties, all of which however, form different objects of this invention when employing the described varieties of suspension of the masses O and M in respect to the mass F. There may be many masses O and M, but there may be only one mass F. Masses O may be disk-shaped.

All the herein described methods of suspension of the mass M with the mass O and with the mass F may be employed in the multi-mass device as their components. A multi-mass system may be composed of more than one type of any of the arrangements previously described herein.

It should be noted generally, that for all the aspects of this invention, it is important that all the detail elements or components, such as the weight of each of the masses and the characteristics of the suspension of masses M and O (A and B), and the radial distances of A and B in respect to the axis of the shaft at which the said masses F and O oscillate or pivot, the position of their respective centers of gravity—one in respect to the other, and each in respect to the axis of the shaft—may all be calculated according to the known theories of resonance of rotating masses (also called theory of harmonics). When considering the mechanical and dynamic character of these devices, such mathematical calculations will provide all the dimensions, weights, etc. for the most advantageous components for each particular problem.

In this specification, axle A is mainly described as being affixed on the mass F rigid with the shaft S, to permit the mass M to pivot thereon having other operative connections (axle B) which communicate such pivoting to the mass O. This invention is not limited thereto, however, for axle A may be either rigidly affixed to the mass F, or rigidly affixed to the mass M, in which case it will be able to pivot in the bearing provided in the mass O therefor. In this case, an operative connection must be established by means of another axle connecting the impulse mass M with the mass F. In such an arrangement, any irregularity of the mass F will then be transmitted to the impulse mass and when the impulse mass pivots, it will substantially dampen the said irregularities through the axle on which it pivots, and use the mass $O_1$ as a dampening mass.

All such arrangements are self-evident, and the majority of the figures in this specification may be interposed accordingly, employing this alternative arrangement when the mass O is rigidly affixed to the shaft S, wherever possible and logical, and the mass F or its components, will be able to rotate freely around the shaft S and coaxially thereto, or, if preferred, eccentric thereto.

In the arrangement shown, by way of example, on Figure 44, the mass M suspended through the axle A on the oscillatory mass O, pivots around the axle A which is rigidly affixed to the mass M by means of keys H. The ends of axle A are provided with bearings P (shown only schematically, but which may be of any suitable type), which permit the free oscillation of mass M. Axle B is mounted on the mass M and establishes an operative connection with mass F. Axle B may, if necessary, be freely rotatable in the mass M, and also, if necessary, even be provided with bearings P. If desired, axle B may also be rigidly affixed on the mass M instead of being mounted on the bearing. Oscillatory mass O must be provided with opening Z to permit the axles to pass through mass O without contacting it, the said opening to be of dimensions that will permit the oscillation of the masses O within the given limits. Mass O is mounted on the shaft S on a bearing $P_2$ of any type.

The free ends of the axle B are mounted on the mass F in an opening $Z_01$ which opening may have the smaller diameter equal to the diameter of the axle B, and the greater diameter larger than the diameter of axle B, so that when the masses M and O are pivoted, the necessary displacement in the said mass F of the axle B may take place. If a bearing is mounted on the axle B of Figure 44, then the opening $Z_01$ must be such that the outer diameter of the bearing affixed to the axle B will be the smaller diameter of the opening and the greater diameter of the opening will be larger than the outer diameter of the bearing in order to permit its displacement when pivoting.

The operation of this device is as follows:

When the device is rotated at the ideal constant speed, all three masses are in equilibrium. As soon as the slightest irregularity occurs in the shaft S, it is immediately transmitted through axle B to the mass M which thereupon begins to pivot, thereby substantially dampening the impulse in toto or in part by oscillating the mass O on which the mass M is suspended. By placing the axle A at a greater distance from the shaft S than axle B, a vice-versa arrangement is obtained. The suspension of the mass itself may be made in accordance with any of the various aspects described in this specification, notably, as depicted in Figures 11 to 17 inclusive.

The axle A may, if necessary, be rigidly affixed to the mass O in which case, mass M will pivot around axle A. If necessary, bearings may be provided between mass M and axle A.

Another embodiment of this invention consists in providing the axles A, B and D with suitable types of bearings—ball, cylinder, needle, cushion, or their equivalents. The use of such bearings is not shown on all the figures described herein, but it is understood that wherever axles A, B and D are mentioned, or where the mass O is mounted on the shaft S, bearings may always be interposed between the rotatable elements.

Another embodiment of this invention consists in mounting axles A or B, or both A and B, in bearings provided with resilient means, i. e. so that the bearings are placed between the outer circumference of the said bearing and the wall of the masses F or O or M to which the resilient means is attached. This can easily be provided by placing springs between the exterior tubular casing forming the outer part and the inner parts of the bearing, or in placing springs made of metal, or rubber cushions between the outer part of the bearing and an additional tubular casing which casing thus forms the final outer circumference of the bearing and may accordingly be placed in the corresponding opening of the masses F, O or M. Or, if the bearing is rigidly attached to the axles A or B, it will roll on the walls of the opening provided therefor. Other types of flexible bearings may be used.

An arrangement such as this provides a disintegration of the disturbing impulses instantaneous with the transmission of the impulses from mass M to mass O and in certain cases, it also permits the elimination, if so desired, of the use of the openings Z, especially when the limits for the oscillations of the masses M and O are very small, so that the elasticity of the flexible bearing may substitute for the means Z provided for such displacement.

I claim:

1. In a vibration damper the combination with a rotatable element of a pair of centrifugal pendulums pivotally mounted thereon on opposite sides of the axis of rotation, an inertia member coaxial with the rotatable element, connections between said pendulums and opposite sides of the inertia member arranged to apply a turning moment to the inertia member as the pendulums swing about their own axes in the same rotative direction.

2. In a vibration damper the combination of a rotatable element, rotatable around a first axis, with a pendulum mounted on said rotatable element and able to oscillate limitedly about a pivot, the axis of which is parallel to said first axis, an inertia mass able to oscillate about a shaft provided therefor, and a connection between said rotatable element, said pendulum and said inertia mass whereby oscillatory movement of said pendulum is transmitted to said inertia mass through said connections to cause oscillatory movements of said inertia mass.

3. In a vibration damper the combination of a rotable element rotating around a first axis with a centrifugal pendulum carried by said element and able freely but limitedly to oscillate around a pivot the axis of which is parallel to said first axis, an inertia element oscillatable freely but limitedly about its center of gravity around said first axis and a connection between said pendulum, said inertia element and said rotatable element whereby oscillation of said pendulum is resisted by the inertia of oscillation of the inertia element.

4. A damper as set forth in claim 2, wherein the axis of said shaft is coaxial with the said first axis.

5. A damper as set forth in claim 2, wherein the axis of said shaft is parallel to said first axis.

6. In a vibration damper the combination of a rotatable element rotating around a first axis with at least two centrifugal pendlums placed symmetrically with respect to said first axis, an inertia element oscillatable freely but limitedly about its center of gravity around said first axis and connections between said pendulums, said inertia element and said rotatable element whereby oscillation of said pendulums is resisted by the inertia of oscillation of the inertia element.

GEORGE A. RUBISSOW.